Figure 1:
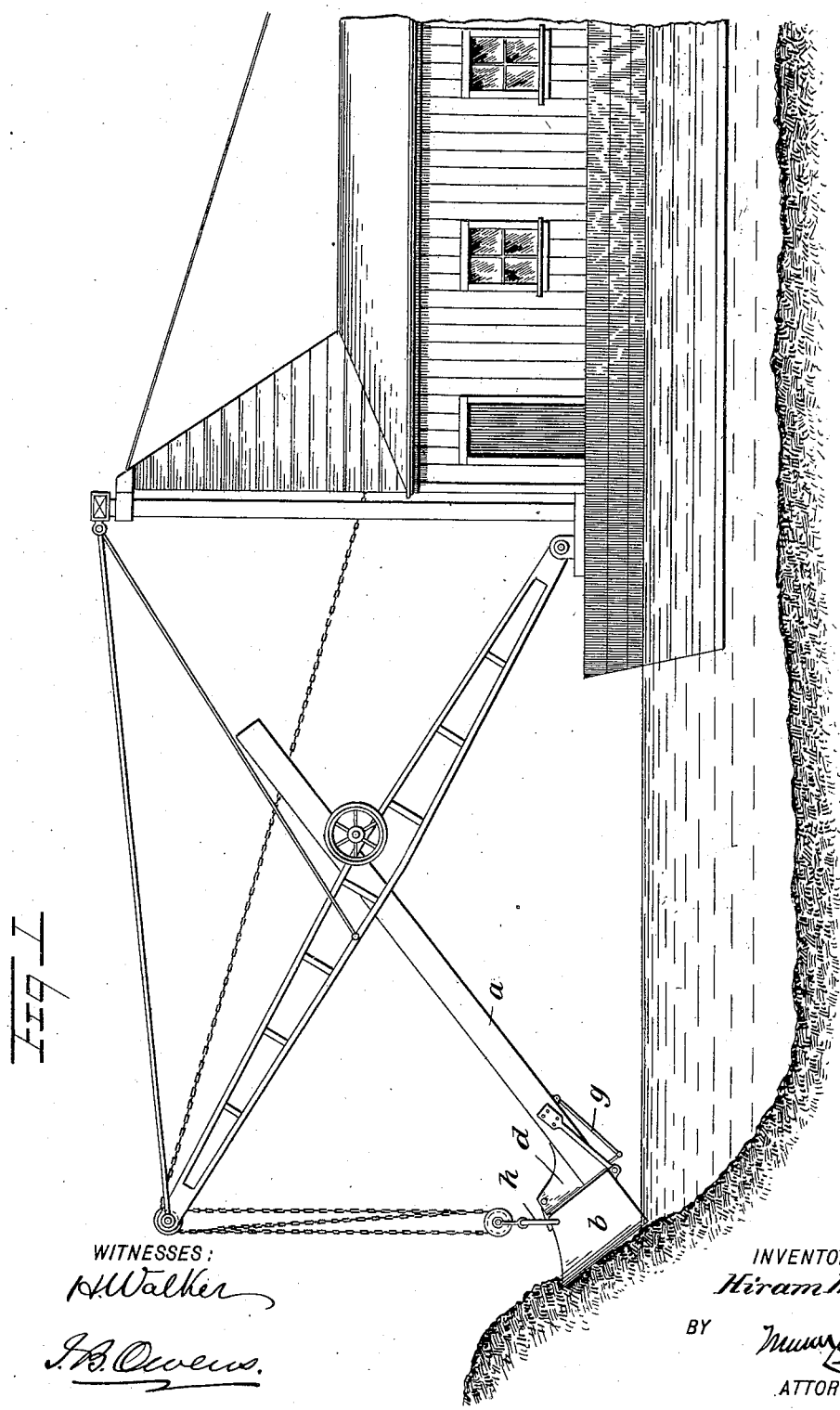

No. 685,136. Patented Oct. 22, 1901.
H. HEAD.
DREDGE SHOVEL.
(Application filed May 18, 1901.)
(No Model.) 2 Sheets—Sheet 1.

WITNESSES:
H. Walker
J. B. Owens.

INVENTOR
Hiram Head
BY
ATTORNEYS

No. 685,136. Patented Oct. 22, 1901.
H. HEAD.
DREDGE SHOVEL.
(Application filed May 18, 1901.)
(No Model.) 2 Sheets—Sheet 2.
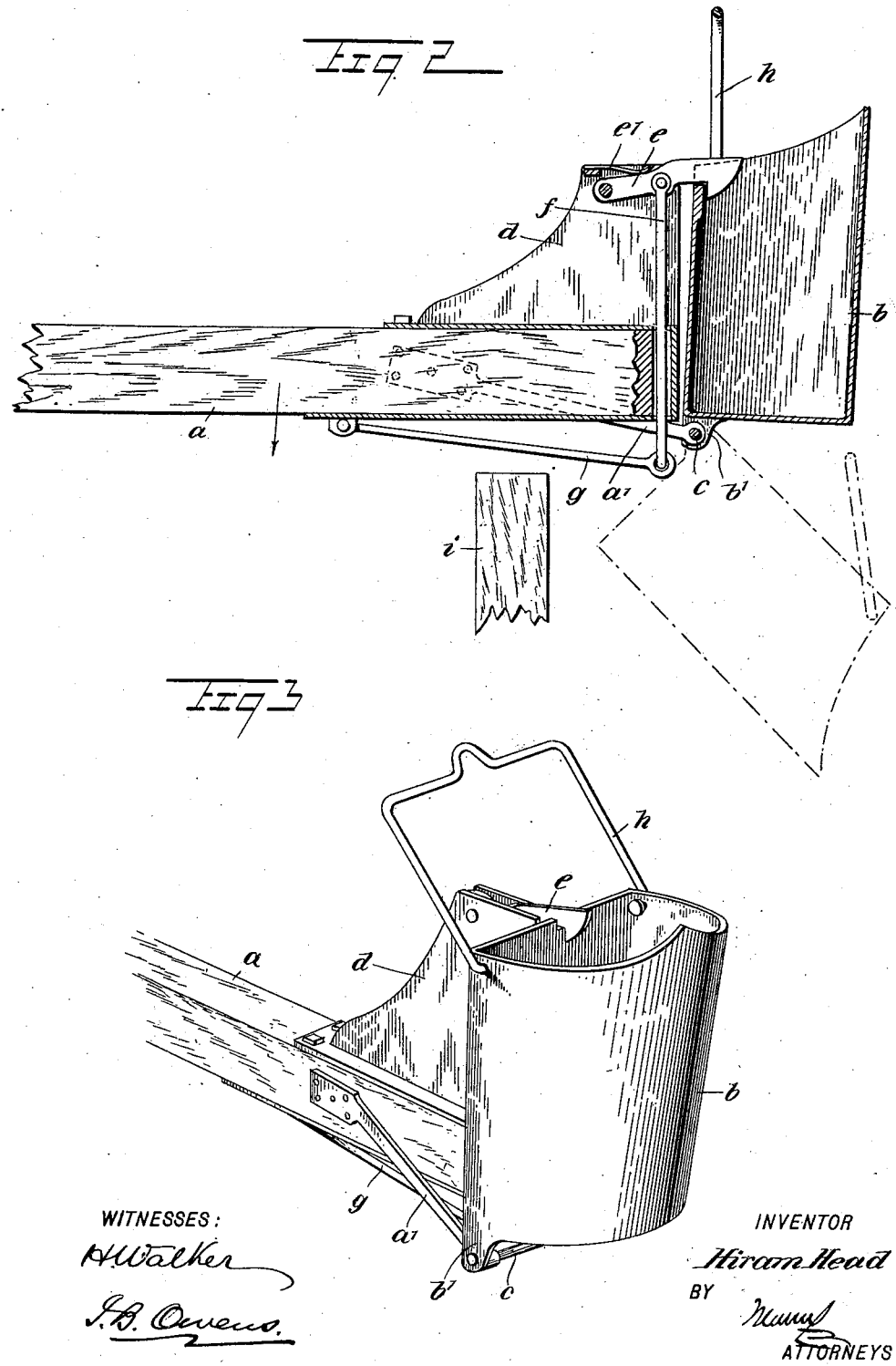

UNITED STATES PATENT OFFICE.

HIRAM HEAD, OF HELENA, MONTANA.

DREDGE-SHOVEL.

SPECIFICATION forming part of Letters Patent No. 685,136, dated October 22, 1901.

Application filed May 18, 1901. Serial No. 60,864. (No model.)

*To all whom it may concern:*

Be it known that I, HIRAM HEAD, a citizen of the United States, and a resident of Helena, in the county of Lewis and Clarke and State of Montana, have invented a new and Improved Dredge-Shovel, of which the following is a full, clear, and exact description.

This invention relates to a shovel for dredging and ditching machines; and the object is to provide an apparatus which when working in water will not spill any portion of its load until the dumping-point is reached. The shovels ordinarily in use open at the bottom, and at this point they invariably leak, causing a considerable loss of the shovel-load previous to the time when it is desired to dump the load. My invention involves such construction as enables me effectively to overcome this disadvantage.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side view showing the invention in use. Fig. 2 is a longitudinal section of the invention, and Fig. 3 is a perspective view thereof.

$a$ indicates the beam carrying the shovel, this beam being mounted on the dredge in the usual or any preferred manner.

$b$ indicates the shovel proper, which is in the form of a can open at its upper end and closed at all of its other sides. This shovel is pivotally mounted by a pin $c$ on the beam $a$, braces $a'$ being applied to the pin to strengthen it and the pin being preferably engaged by lugs $b'$, formed on the bottom of the shovel proper.

$d$ indicates a bracket which is fastened to the upper side of the beam $a$ at its end and which is preferably constructed of two parallel side or cheek pieces. Between these cheek-pieces of the bracket $d$ is pivotally mounted the dog $e$, which serves to engage the upper edge of the shovel or bucket $b$, holding it in the active position shown by full lines in the drawings. A spring $e'$ presses down on the dog to throw it into active position. Connected with the dog and passing downward through the bracket $d$ is a trip-rod $f$, the lower end of which extends below the beam $a$ and is joined to an arm $g$, pivotally mounted on the under side of the beam $a$. By pressing up on this arm $g$ the trip-rod $f$ will be raised and the dog $e$ will be thrown out of engagement with the bucket, permitting it to tilt into the dumping position, as indicated by the dotted lines in Fig. 2.

$h$ indicates the bail, which is attached to the shovel or bucket proper, $b$, for hoisting the same, as indicated in Fig. 1.

The beam $a$, with the shovel attached, is operated in the usual manner, and when the shovel is loaded it is raised and thrown sidewise to be dumped. At the dumping-point is located a post, (indicated at $i$ in Fig. 2.) This post is stationary with respect to the beam $a$, and when it is desired to dump the shovel the beam is lowered, so as to strike the arm $g$ upon the post. This will throw up the trip-rod $f$ and release the dog, whereupon the tackle connected with the bail $h$ having been slackened the bucket will fall to dumping position. It will be observed in connection with this device that the load once in the bucket it will be impossible for to leak out and that the bucket may only be emptied by releasing the dog. When the dog is released, the bucket will immediately fall, owing to force of gravity, to its dumping position. This shovel is especially advantageous in such operations as involve the gathering of precious metals. In the ordinary shovel, where there is a leakage at the bottom, a large percentage of the metals is lost, owing to their weight, which causes them to gravitate to the bottom of the bucket, and therefore to pass out of the same before the baser materials escape.

Having thus described my invention, I claim as new and desire to secure by Letters Patent—

1. The combination with a dredge-beam, of a bucket mounted thereon, means for removably holding the bucket in carrying position, and a member stationary with respect to the beam, such member being arranged to actuate the means for holding the bucket in carrying position.

2. The combination of a dredge-beam, a bucket mounted thereon, means for holding the bucket in carrying position, and a member stationary with respect to the beam, such member being arranged to be struck by said means for holding the bucket in carrying position, whereby to dump the bucket.

3. The combination with the beam or supporting member, of a bucket hingedly mounted thereon, a latch supported from the beam and engaging the bucket to hold it in carrying position, a trip-rod attached to the latch and passing downwardly to a point below the beam, and an arm movably mounted on the under side of the beam and connected to the beam.

In testimony whereof I have signed my name to this specification in the presence of two subscribing witnesses.

HIRAM HEAD.

Witnesses:
JOHN W. WADE,
F. ADKINSON.